United States Patent
Ramachandran et al.

(10) Patent No.: US 9,172,756 B2
(45) Date of Patent: Oct. 27, 2015

(54) OPTIMIZING APPLICATION PERFORMANCE IN A NETWORK ENVIRONMENT

(71) Applicant: CISCO TECHNOLOGY, INC., San Jose, CA (US)

(72) Inventors: Karthikeyan Ramachandran, Bangalore (IN); Sragdhara Datta Chaudhuri, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 319 days.

(21) Appl. No.: 13/797,177

(22) Filed: Mar. 12, 2013

(65) Prior Publication Data
US 2014/0280813 A1 Sep. 18, 2014

(51) Int. Cl.
G06F 15/173 (2006.01)
H04L 29/08 (2006.01)
H04L 29/06 (2006.01)

(52) U.S. Cl.
CPC ............ *H04L 67/14* (2013.01); *H04L 67/1006* (2013.01); *H04L 67/1023* (2013.01); *H04L 69/22* (2013.01)

(58) Field of Classification Search
CPC ... H04L 29/08; H04L 65/608; H04L 67/1023; H04L 67/14; H04L 69/22; H04L 45/745; H04L 12/56; H04L 45/7453; H04L 67/1025
USPC .......... 709/203, 223, 206; 370/389, 229, 392; 718/105
See application file for complete search history.

(56) References Cited

U.S. PATENT DOCUMENTS

| | | | |
|---|---|---|---|
| 6,870,849 B1 * | 3/2005 | Callon et al. | 370/395.32 |
| 7,212,527 B2 * | 5/2007 | Shah et al | 370/389 |
| 2011/0161500 A1 | 6/2011 | Yengalasetti et al. | |
| 2012/0254389 A1 | 10/2012 | Amemiya et al. | |
| 2013/0343181 A1 * | 12/2013 | Stroud et al. | 370/229 |
| 2013/0343377 A1 * | 12/2013 | Stroud et al. | 370/389 |

OTHER PUBLICATIONS

Intel Corporation, "Packet Processing with Intel® Multi-Core Processors: General Purpose Processor Exceeds Network Processor Performance," White Paper, © 2008, 12 pages. http://www.techrepublic.com/whitepapers/packet-processing-with-intel-multi-core-processors-general-purpose-processor-exceeds-network-processor-performance/1109453.

Cisco Systems, Inc., "IPv6 Extension Headers Review and Considerations," White Paper, © 1992-2006, 12 pages. http://www.cisco.com/en/US/technologies/tk648/tk872/technologies_white_paper0900aecd8054d37d.pdf.

* cited by examiner

*Primary Examiner* — Frantz Jean
(74) *Attorney, Agent, or Firm* — Patent Capital Group (57) ABSTRACT

An example method for optimizing application performance in a network environment is provided and includes retrieving an L7 session identifier (ID) from a packet, generating a hash from at least the L7 session ID, and inserting the hash into a header of the packet. The L7 session ID identifies a particular application layer session between a client and a server in a network environment. The server includes a plurality of processors configured to process the packet, and the hash indicates a specific processor in the plurality of processors.

20 Claims, 3 Drawing Sheets

OPTIMIZING APPLICATION PERFORMANCE IN A NETWORK ENVIRONMENT

TECHNICAL FIELD

This disclosure relates in general to the field of communications and, more particularly, to optimizing application performance in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

OVERVIEW

An example method for optimizing application performance in a network environment includes retrieving an L7 session identifier (ID) from a packet, generating a hash from at least the L7 session ID, and inserting the hash into a header of the packet. As used herein, the term "hash" includes any representation (numeric, alphanumeric, symbol, code, etc.) that reflects a relationship between a fixed sized number and variable size data. The L7 session ID identifies a particular application layer session between a client and a server in a network environment. The server includes a plurality of processors configured to process the packet, and the hash indicates a specific processor in the plurality of processors.

Example Embodiments

Figure 1:
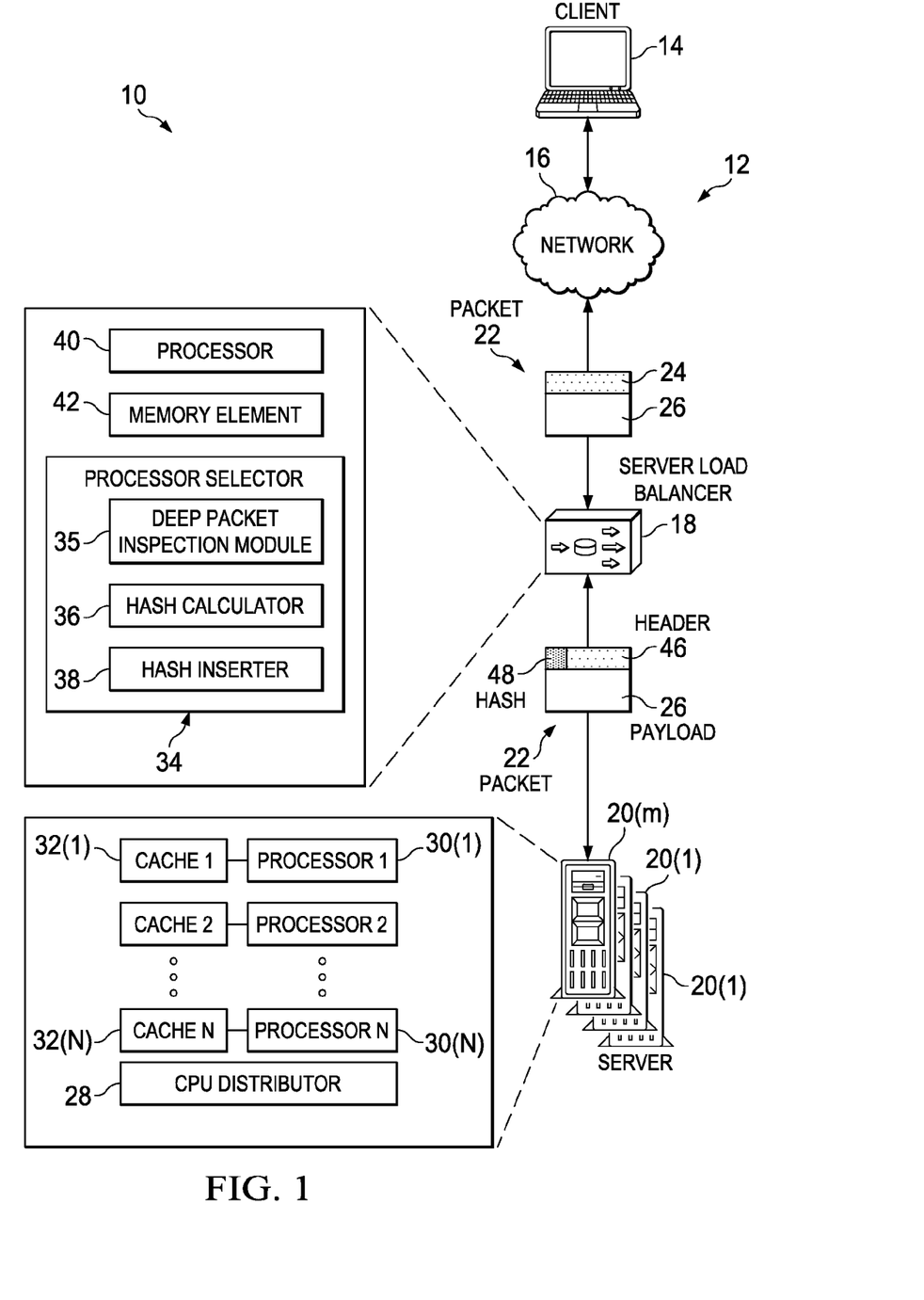
FIG. 1 is a simplified block diagram illustrating a communication system for optimizing application performance in a network environment.

Turning to FIG. 1, FIG. 1 is a simplified block diagram illustrating an embodiment of communication system 10 for optimizing application performance in a network environment. Communication system 10 includes a network 12 (generally indicated by an arrow) comprising a client 14 in communication over a network 16 (e.g., Internet) through a server load balancer (SLB) 18, with one or more servers 20(1)-20 (m). SLB 18 may receive incoming packet 22 from client 14. Packet 22 may comprise a header 24 and a payload 26.

As used herein, the term "packet" includes any unit of data routed between a source (e.g., client 14) and a destination (e.g., server 20(1)) over a network (e.g., network 16). For example, when any file (e.g., e-mail message, Graphics Interchange Format file, Uniform Resource Locator request, etc.) is sent from client 14 to server 20(1), a Transmission Control Protocol (TCP) layer at client 14 divides the file into packets that are separately numbered and include the Internet Protocol (IP) address of the destination. The individual packets may travel different routes through network 16 before reaching destination server 20(1), where they are reassembled into the original file by another TCP layer at server 20(1). The "header" is a portion of packet 22 that precedes payload 26 and includes addressing and other information required for packet 22 to reach its destination. "Payload" is the body of packet 22 that includes essential data applicable to the communication between client 14 and server 20(1).

Each server, for example, server 20(1) may comprise a Central Processor Unit (CPU) distributor 28, which may distribute processing across one or more processors 30(1)-30(N) that can process packets received at server 20(1). Each processor 30(1), 30(2), . . . 30(N) may include, or be coupled to, a corresponding cache 32(1), 32(2), . . . 32(N). Processes executed by any one processor 30(1) may use corresponding cache 32(1) to temporarily store information used in the processing. For example, data plane operations (e.g., forwarding tables) of processor 30(1) may use cache 32(1) to store relevant data; instructions executed by processor 30(1) may be stored in cache 32(1) during execution.

SLB 18 may include a processor selector 34 that can select any one processor 30(1) from a selected server 20(1) to process incoming packet 22. Processor selector 34 can comprise a deep packet inspection module 35 that can parse Layer 7 (L7) fields in packet 22, a hash calculator 36 that calculates a hash value, and a hash inserter 38. A processor 40 and a memory element 42 may facilitate the operations of SLB 18. Processor selector 34 may inspect packet 22, with a new header 46, which can include a hash 48 corresponding to selected processor 30(1).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A datacenter can include multi-core servers running applications (e.g. hyper text transfer protocol (HTTP)) and a server load balancer (e.g., Cisco Application Control Engine) front-ending the servers. The SLB intercepts packets at the datacenter, selects an appropriate server that can process the packet, and forwards the packet to the selected server. With multi-core servers comprising multiple processors in a single physical server, packets of a specific connection (e.g., from a specific client for a particular Layer 7 communication session) may not be processed by the same processor, thereby introducing latency. In current network environments, with increasing bandwidth, and faster networking hardware, a single processor cannot efficiently and speedily process packets as desired. Hence, it has become common to add more processors to a single physical server and distribute the processing across the multiple processors.

From the server's operating system's point of view, distributing the work of outgoing data across multiple processors can be relatively straight forward, for example, using multiple transmit queues. The processes generating data can naturally spread out across the server's multiple processors without encountering or generating errors. In comparison, incoming data from a single source (e.g., network interface card (NIC)) is harder to distribute. Some NICs can facilitate distribution of incoming packets across multiple processors through receive side scaling (RSS) mechanism, in which the processors support multiple receive queues and multiple interrupt lines. Typical processors (and NICs) are equipped with a single receive queue; thus incoming packets are placed into a single, serialized stream.

Parallelizing the input stream can require intelligence on the part of the server's operating system. A receive packet steering (RPS) mechanism in some operating systems (e.g., Linux) achieves the parallelizing by hooking into the receive path when a packet is passed into the networking subsystem. The NIC driver creates a hash from the relevant protocol data (e.g. IP addresses and port), typically associated with Open Systems Interconnection (OSI) Layer 3 or 4, in the packet and uses the hash to select a processor; the packet is then enqueued for the target processor's attention. The hash can ensure that packets belonging to the same stream of data (e.g., flow, connection, session) are processed by the same processor, increasing cache locality (and thus, performance) of the server.

However, the application that may eventually process the packet may be executing on a different processor than the one into which the packet was enqueued through hashing. Receive Flow Steering (RFS) mechanism attempts to solve this problem by associating a flow to the processor that is executing the application. The NIC driver may maintain a table that maps the processor executing the application to the flow hash. To avoid out-of-order packet processing in case of application rescheduling to a different processor, another queue is used.

In a multi-core server, RSS/RPS/RFS and other such mechanisms help to distribute received flows across multiple CPU cores so that the processors are utilized somewhat uniformly. Correspondingly, the cache of each processor is also utilized to obtain performance benefits. RSS/RPS/RFS and other such mechanisms ensure that packets belonging to the same flow, as detected based on the packets' L3 (network layer) or L4 (transport layer) information in the header, are directed to the same core and that core is one of those that are running the application.

Turning the OSI model of network protocols, L3 network layer facilitates transferring variable length data sequences from a source host on one network to a destination host on a different network (in contrast to the L2 data link layer that connects hosts within the same network), while maintaining quality of service requested by the L4 transport layer. The L3 network layer performs network routing functions, and might also perform fragmentation and reassembly, and report delivery errors. L4 transport layer provides transparent transfer of data between end users, providing reliable data transfer services to the upper layers (layers above L4), and is responsible for end-to-end error recovery and flow control. The L4 transport layer controls the reliability of a given link through flow control, segmentation/de-segmentation, and error control. Some L4 protocols can be state-oriented and connection-oriented.

In contrast to L3 and L4, the application layer (layer 7 or L7) is closest to the end user, and interacts directly with the application, which requests, generates, and transmits the data in the network. Application-layer functions of the application layer typically include identifying communication partners, determining resource availability, and synchronizing communication for the specific application. At the application layer, communication partners are identified, quality of service is determined, user authentication and privacy are considered, and any constraints on data syntax are recognized. Functions at the application layer are application-specific. For example, the application layer provides application services for file transfers, e-mail, and other network software services.

When multiple flows belong to the same L7 session between a client and a server, the server cannot currently ensure that the flows are sent to the same processor, resulting in poor cache locality and cache misses. For example, in a shopping cart usage scenario, where multiple TCP flows (at L4 transport layer) are tied to one HTTP session (at L7 application session), the server typically uses cookies to identify the L7 session and obtain the session related data structures. In current flow-based mechanisms, each such flow can be sent to different processors for processing, and each such processor would have to fetch and/or duplicate the same L7 session information in their processor-local caches.

In a typical SLB operation, when the first flow of an L7 session (e.g., HTTP session) is encountered, the SLB may execute normal (e.g., regular, typical, customary, common) load balancing algorithms and select a server from a group of servers. A specific processor from a group of processors in the server may process the first flow of packets. The SLB may create an entry in a sticky database (e.g., a database used to store server information for sticky sessions, where the same server processes packets belonging to the same session) for a cookie (e.g., data structure) representing the L7 session ID. As used herein, the term "L7 session ID" includes any data structure that can be used to identify a particular application layer session.

A "session" is a semi-permanent interactive information interchange, also known as a dialogue, a conversation, or a meeting, between two or more communicating devices, in which a series of messages are exchanged. Sessions may be implemented as part of protocols and services at the application layer. HTTP sessions, and telnet remote login sessions are examples of application layer sessions. In general, the L7 session ID is a unique identifier of the application layer session. In some L7 sessions, the L7 session ID can be in the form of a hash generated by a hash function and sent from the server to the client (or vice versa) to identify the current session. In an example HTTP session, the client usually stores and sends the L7 session ID as an HTTP cookie and/or sends it to the server as a parameter in GET or POST queries during the session. In another example L7 session, the client may set the L7 session ID, for example, using a "username" entered by the end user. Any suitable identifier that can uniquely identify a specific L7 session is included in the term "session ID" as used herein.

Most client-server sessions are maintained by the transport layer with a single connection for a single session. However, in some application layer sessions (e.g., Web/HTTP sessions), each transaction phase of the session creates a separate connection. Maintaining session continuity between connections requires the L7 session ID. When a subsequent packet of a second HTTP flow having with same L7 session ID (e.g., HTTP cookie) is encountered (even though the request could be over a different TCP connection), the SLB sends the packet to the same server that received the first flow. However, on the server, the second flow can be hashed to a different processor from the one that processed the first flow (assuming that the application can execute on multiple processors). Because the first and second flows belong to the same L7 session, they would access the same data structures and it would have helped performance (based on local caching of data for each processor) if both flows were processed by the same processor.

Communication system 10 is configured to address these issues (and others) in offering a system and method for optimizing application performance in a network environment. In various embodiments, substantially all flows of a common L7 session can be sent to and processed by the same processor (e.g., processor 30(1)). Thus, for example, servers 20(1)-20(m) can take advantage of cache locality of the L7 sessions. According to various embodiments, in addition to selecting server 20(1) (e.g., based on server load balancing algorithms), SLB 18 may also select processor 30(1) in server 20(1). Deep packet inspection module 35 may parse L7 fields in packet 22, and determine various L7 parameters, such as L7 session ID for hash calculation. In some embodiments, the L7 fields may be located in packet header 24; in other embodiments, the L7 fields may be located in payload 26. In various embodiments, deep packet inspection module 35 may be configured with instructions to search for the L7 parameters in packet header 24, or payload 26, or both. Hash calculator 36 may calculate hash 48 based on the L7 parameters. Hash calculator 36 may use any suitable hash function to generate hash 48 according to the broad scope of the embodiments.

Hash inserter 38 may add hash 48 into header 46 of packet 22. Thus, in contrast to mechanisms where the hash calculation for processor selection is performed at server 20(1), the hash calculation according to embodiments of communication system 10 may be performed at SLB 18. CPU distributor 28 in server 20(1) may read hash 48, and direct packet 22 to processor 30(1) based on hash 48. In various embodiments, hash 48 may indicate the specific processor 30(1), to which to send packet 22. For example, each processor 30(1)-30(N) may be identified by a processor ID, which can be a bounded length string of numbers and letters (or a combination thereof). The processor ID may be mapped to hash 48 based on the number of processors N in server 20(1). For example, the processor ID may be specified as a modulo operation (i.e., mathematical operation that funds of remainder of division of one number by another) of hash 48 and the number of processors (N); processor ID=h mod N, where h is hash 48. SLB 18 can ensure that the same hash value is inserted for flows belonging to the same L7 session, thereby directing flows of the L7 session to the same processor 30(1) on server 20(1).

According to various embodiments, SLB 18 may routinely perform other L7 processing, such as L7 parsing, and Regex (regular expression) matching, involving decisions on actions to be taken for flows of a particular L7 session. For example, for an HTTP session, SLB 18 may perform Regex matching of a uniform resource locator (URL) field in packet 22 to select a policy to be applied; based on the policy, SLB 18 may forward packet 22 to server 20(1). SLB 18 may also bundle multiple L3 or L4 flows under a common L7 session, with substantially all flows sharing some common L7 attribute like an L7 session ID. For example, SLB 18 can use a cookie in an HTTP data structure of header 24 to bundle multiple TCP flows under a single HTTP session.

During operation, when a first flow of an L7 session is encountered at SLB 18, SLB 18 may select server 20(1) according to any suitable server load balancing algorithm. In addition, SLB 18 may calculate and insert hash 48 in header 46 of packet 22 before forwarding packet 22 to server 20(1). In some embodiments, hash 48 may be calculated based on an identifier e.g. (HTTP cookie) that is common to substantially all the flows belonging to an L7 session. Server 20(1) may select processor 30(1) based on hash 48 encountered in header 46 of packet 22. Servers 20(1)-20(m) may be configured with an option to skip processor selection by calculating a hash, and instead choose hash 48 provided in header 46 of packet 22 from SLB 18. Servers 20(1)-20(m) can also execute other algorithms such as RPS, RFS etc. based on particular needs.

When a second flow (e.g., from a different Internet Protocol (IP) address or port) in the same L7 session is encountered at SLB 18 (for example, as detected by the HTTP data structure (cookie) of the L7 session ID in header 24), SLB 18 may select the same server 20(1) and insert same hash 48 as for the first flow. Server 20(1), on receiving packet 22 from the second flow, may use hash 48 to forward packet 22 to processor 30(1), as before. Note that although the example operations indicate an HTTP session, any L7 protocol having multiple flows may take advantage of embodiments of communication system 10. For example, secure socket layer (SSL) session with L7 session ID reuse may be implemented according to embodiments of communication system 10. SLB 18 may facilitate processing the packets of different flows of the SSL session by the same processor in the same server.

In a general sense, hash 48 may include sufficient number of bits to cover substantially all processors in any server in network 12. For example, if a maximum number of processors is 10, hash 48 may include sufficient bits to cover 10 processors. In some embodiments, the header fields of L2 or L3 header may be used to insert hash 48. Thus, hash 48 may be inserted into the network layer header fields or the transport layer header fields of packet 22. In other embodiments, additional encapsulation can be added to insert hash 48. Any suitable mechanism may be used within the broad scope of the embodiments to convey hash 48 in header 46. For example, if both SLB 18 and servers 20(1)-20(m) are controlled by the same entity, a proprietary header can be chosen to convey hash 48. For example, hash 48 may be inserted into an application context tag of an EtherType field (EtherType is a two-octet field in an Ethernet frame; it is used to indicate which protocol is encapsulated in the payload of an Ethernet Frame). In another example, hash 48 may be inserted into an IPv6 extension header (e.g., headers in an IPv6 protocol packet including customized options that can be added on). In yet another example, hash 48 may be inserted into a suffix on the packet.

Embodiments of communication system 10 can use any suitable device, such as SLB 18, which is capable of L7 processing device, to influence processor selection on servers 20(1)-20(m) to benefit performance, for example, by better cache utilization through processing substantially all flows of a session by the same processor (e.g., processor 30(1)). Although the operations of embodiments of communication system 10 are indicated with reference to a server load balancer, any network element that can perform L7 processing can be used instead (or additionally) within the broad scope of the embodiments. As used herein, the term 'network element' is meant to encompass computers, network appliances, servers, routers, switches, gateways, bridges, serve load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Embodiments of communication system 10 can influence processor selection of servers 20(1)-20(m) from a device external to them, such as SLB 18 that is positioned ahead of them in network 12. In some embodiments, adding L7 session awareness in the processor selection criteria can improve performance by better cache locality (e.g., of L7 session database) on servers 20(1)-20(m). In various embodiments, adding processor selection capability to the L7 processing device may be a relatively simple change to the device configuration, with relatively high positive impact on performance.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of switches and hosts within the broad scope of the present disclosure.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 12 may represent any type of network, including Internet, enterprise networks, cloud networks, etc.

In various embodiments, client 14 is part of a client/server network model, and includes a computer program that, as part of its operation, sends one or more requests to another computer program representing one of servers 20(1)-20(m) over network 12. Each server 20(1)-20(m) comprises a computer program that provides services to one or more clients 14 over network 12. Each server 20(1)-20(m) may be located in separate computing devices, or more than one of servers 20(1)-20(m) may be located on a single (common) physical device (e.g., in the form of virtual machines).

According to various embodiments, SLB 18 comprises a network element capable of L7 processing. As such, SLB 18 can represent hardware, software, or combination thereof, that can execute server load balancing algorithms based on various factors, including number of connections of the servers with respect to load, source or destination address, cookies, URLs, or HTTP headers. Processor selector 34 includes an application capable of executing on SLB 18 (or other suitable L7 processing device) to perform the hash calculation and insertion activities (among other activities) described herein with respect to embodiments of communication system 10. In some embodiments, processor selector 34 may be implemented in SLB 18. In other embodiments, processor selector 34 may be implemented in another network element (e.g., Network Interface Card) coupled to, or in communication with, SLB 18. In some embodiments, the L7 processing capability may be specific to processor selector 34, and processor selector 34 may be implemented in any suitable network element (such as a firewall) that otherwise may not be capable of L7 processing. In some embodiments, processor selector 34 may be implemented in hardware, for example, as part of a Network Interface Card. In other embodiments, processor selector 34 may be implemented in software. In yet other embodiments, processor selector 34 may be implemented as a combination of hardware and software.

Figure 2:
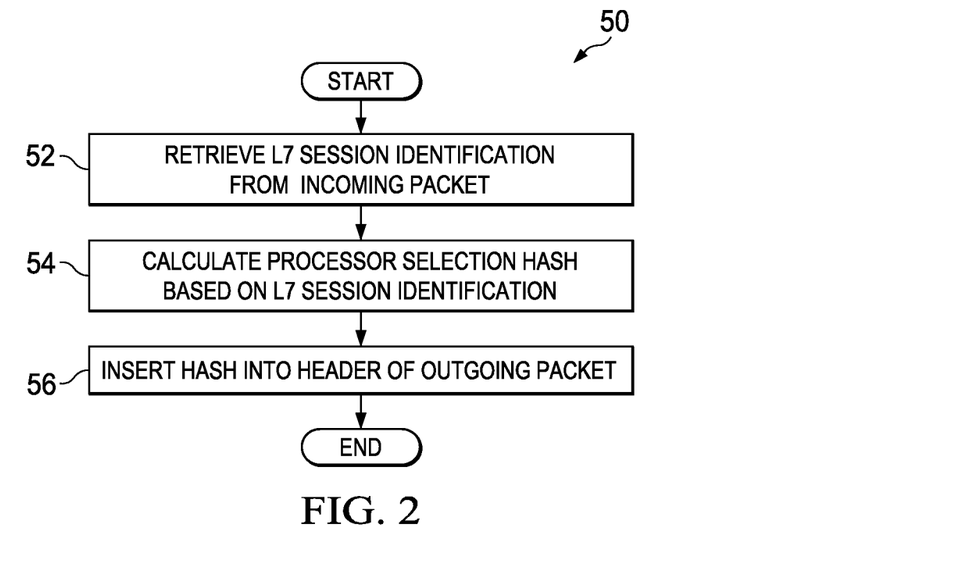
FIG. 2 is a simplified flow diagram illustrating example operational activities that may be associated with embodiments of the communication system.

Turning to FIG. 2, FIG. 2 is a simplified flow diagram illustrating example operations 50 that may be associated with processor selection according to an embodiment of communication system 10. At 52, an L7 session ID (or other suitable identifier of an L7 session) may be retrieved from incoming packet 22 at packet selector 34. At 54, processor selection hash 48 may be calculated based on the L7 session ID. For example, a 'jhash' routine may be implemented in a Linux kernel, which can be configured to operate on the L7 session ID and other fields in header 26 such as IP source address, IP destination address, IP source port number, IP destination port number and protocol ID. At 56, hash 48 may be inserted into header 46 of outgoing packet 22. In some embodiments, hash 48 may be inserted into an L3 or L4 header field; in other embodiments, an additional encapsulation layer including hash 48 may be added to header 46.

Figure 3:
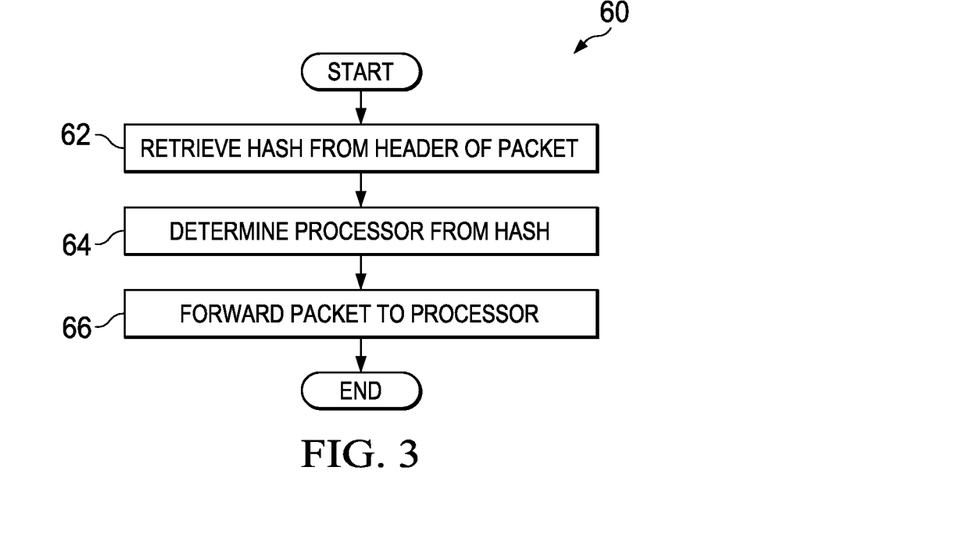
FIG. 3 is a simplified flow diagram illustrating other example operational activities that may be associated with embodiments of the communication system.

Turning to FIG. 3, FIG. 3 is a simplified flow diagram illustrating example operations 60 that may be associated with processor selection at servers according to an embodiment of communication system 10. At 62, CPU distributor 28 may retrieve hash 48 from header 46 of packet 22. At 64, the assigned processor 30(1) may be determined from hash 48. At 66, packet 22 may be forwarded to processor 30(1).

Figure 4:
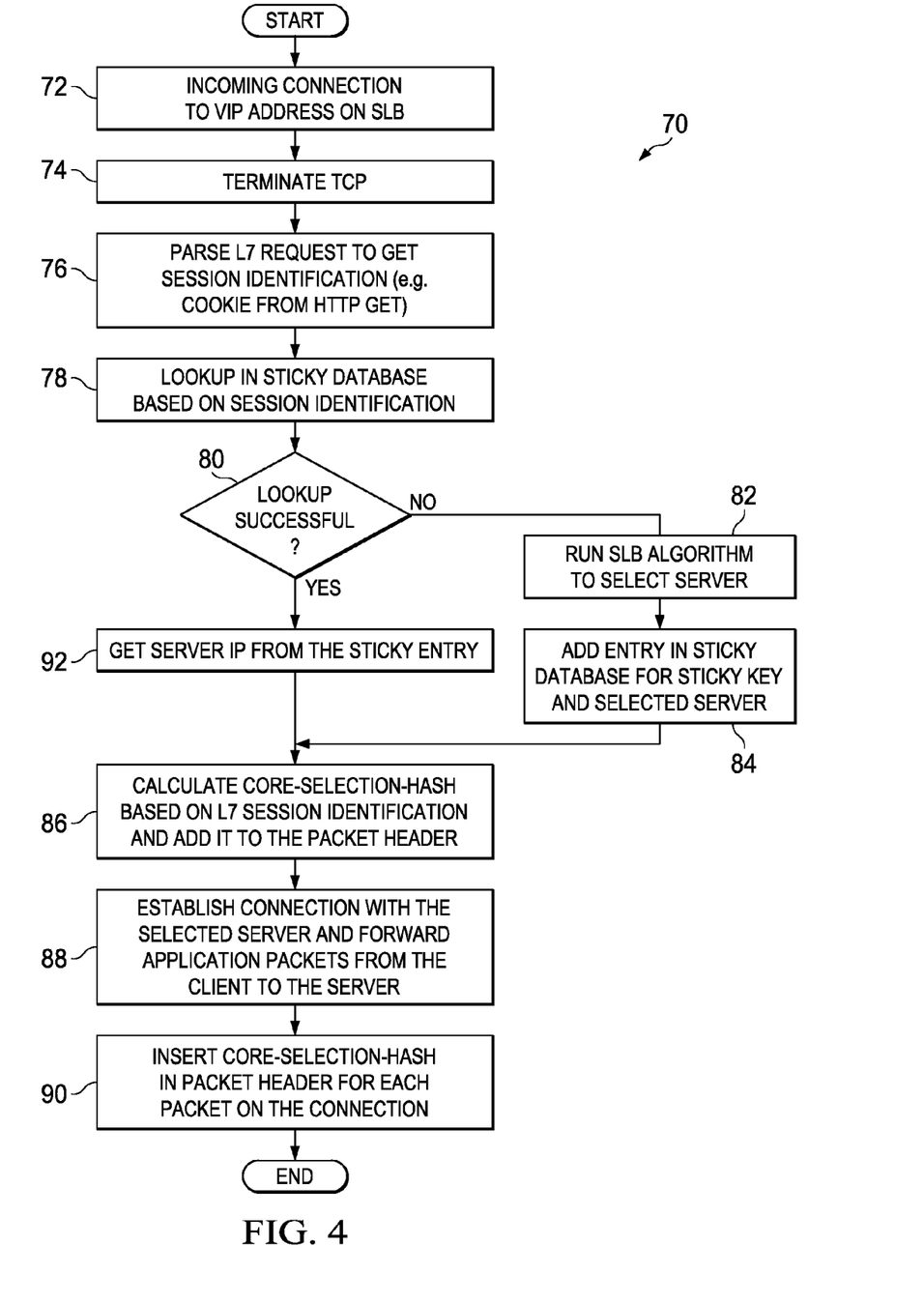
FIG. 4 is a simplified flow diagram illustrating yet other example operational activities that may be associated with embodiments of communication system.

Turning to FIG. 4, FIG. 4 is a simplified flow diagram illustrating example operations 70 that may be associated with an embodiment of communication system 10. At 72, an incoming TCP connection to a virtual IP address (VIP) may be detected on SLB 18. At 74, the TCP connection may be terminated. As 76, the L7 request to get L7 session ID may be parsed (e.g., cookie from HTTP GET). At 78, a sticky database may be looked up to determine the appropriate destination server 20(1) based on the L7 session ID. At 80, a determination may be made whether the lookup is successful, for example, if the flow characterized by the IP addresses and ports specified in packet 22 has been encountered previously. If the lookup is not successful (e.g., flow has not been encountered previously), at 82, one or more SLB algorithms may be executed to select an appropriate server 20(1). At 84, a suitable sticky key (e.g., including L7 session ID) and selected server 20(1) may be entered in the sticky database.

At 86, processor selector 34 may calculate hash 48 (e.g., core selection hash) based at least on the L7 session ID and insert hash 48 to header 46 of packet 22. At 88, a connection may be established with selected server 20(1) and SLB 18 may forward application packet 22 client 14 to server 20(1). At 90, SLB 18 may insert hash 48 in header 46 of each packet 22 of the L7 session (e.g., connection). Turning back to 80, if the lookup of the sticky database is successful (indicating that the flow to which the packet belongs has already been encountered), the server IP address may be obtained from the sticky entry, and the operations may step to 86 and proceed thereon. In such scenarios, SLB 18 may have already allocated (or determined) a suitable server to process the flow, and as such, need not re-select another server for the same flow.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, SLB 18, processor selector 34, and CPU distributor 28. In some embodiments, one or more of these features may be implemented in hardware, provided external to these elements, or consolidated in any appropriate manner to achieve the intended functionality. The various network elements (e.g., SLB 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, processor selector 34 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 42) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving at a load balancer in a network environment, a packet destined to an application executing at a plurality of servers in the network, wherein each server comprises a plurality of processors configured to process the packet;
   selecting, by the load balancer, a specific one of the servers to forward the packet;
   retrieving, by the load balancer, an L7 session identifier (ID) from the packet, wherein the L7 session ID identifies a particular application layer session corresponding to the application;
   generating, by the load balancer, a hash from at least the L7 session ID, wherein the hash indicates a specific processor in the plurality of processors in the selected server;
   inserting the hash into a header of the packet; and
   forwarding the packet with the hash to the selected server, wherein the specific processor indicated by the hash processes the packet in the selected server.

2. The method of claim 1, wherein the server is configured to forward the packet to the specific processor indicated by the hash.

3. The method of claim 1, wherein the specific processor is indicated by a processor identifier that is a modulo of the hash and the number of processors in the plurality of processors.

4. The method of claim 1, wherein the hash is inserted into at least one field from a group consisting of transport layer header fields and network layer header fields.

5. The method of claim 1, wherein the hash is inserted into at least one field selected from a group consisting of application context tag in an EtherType field and an Internet Protocol version 6 (IPv6) extension header.

6. The method of claim 1, further comprising inserting the hash into headers of substantially all packets of the particular application layer session.

7. The method of claim 6, wherein at least some packets belong to one flow of the application layer session, and other packets belong to another flow of the application layer session.

8. The method of claim 1, further comprising looking up a sticky database to determine the server indicated by the L7 session ID.

9. The method of claim 8, further comprising selecting the server according to a server load balancing algorithm if the lookup is unsuccessful.

10. The method of claim 9, further comprising adding an entry into the sticky database to indicate the server selected according to the server load balancing algorithm corresponding to the L7 session ID.

11. One or more non-transitory media encoding logic that includes instructions for execution and when executed by a processor, is operable to perform operations comprising:
    receiving at a load balancer in a network environment, a packet destined to an application executing at a plurality of servers in the network, wherein each server comprises a plurality of processors configured to process the packet;
    selecting, by the load balancer, a specific one of the servers to forward the packet;
    retrieving, by the load balancer, an L7 session identifier (ID) from the packet, wherein the L7 session ID identifies a particular application layer session corresponding to the application;
    generating, by the load balancer, a hash from at least the L7 session ID, wherein the hash indicates a specific processor in the plurality of processors in the selected server;
    inserting the hash into a header of the packet; and
    forwarding the packet with the hash to the selected server, wherein the specific processor indicated by the hash processes the packet in the selected server.

12. The media of claim 11, wherein the server is configured to forward the packet to the specific processor indicated by the hash.

13. The media of claim 11, wherein the specific processor is indicated by a processor identifier that is a modulo of the hash and the number of processors in the plurality of processors.

14. The media of claim 11, wherein the operations further comprise inserting the hash into headers of substantially all packets of the particular application layer session.

15. The media of claim 14, wherein at least some packets belong to one flow of the application layer session, and other packets belong to another flow of the application layer session.

16. An apparatus in a network environment, comprising:
    a memory element for storing data; and
    a processor that executes instructions associated with the data, wherein the processor and the memory element cooperate such that the apparatus is configured for:
        receiving at the apparatus, a packet destined to an application executing at a plurality of servers in the network, wherein each server comprises a plurality of processors configured to process the packet;
        selecting, by the apparatus, a specific one of the servers to forward the packet;
        retrieving, by the apparatus, an L7 session identifier (ID) from the packet, wherein the L7 session ID identifies a particular application layer session corresponding to the application;

generating, by the apparatus, a hash from at least the L7 session ID, wherein the hash indicates a specific processor in the plurality of processors in the selected server;

inserting the hash into a header of the packet; and forwarding the packet with the hash to the selected server, wherein the specific processor indicated by the hash processes the packet in the selected server.

17. The apparatus of claim 16, wherein the server is configured to forward the packet to the specific processor indicated by the hash.

18. The apparatus of claim 16, wherein the specific processor is indicated by a processor identifier that is a modulo of the hash and the number of processors in the plurality of processors.

19. The apparatus of claim 16, wherein the apparatus is further configured for inserting the hash into headers of substantially all packets of the particular application layer session.

20. The apparatus of claim 19, wherein at least some packets belong to one flow of the application layer session, and other packets belong to another flow of the application layer session.

* * * * *